US009384219B2

(12) United States Patent
Ushijima et al.

(10) Patent No.: US 9,384,219 B2
(45) Date of Patent: Jul. 5, 2016

(54) COMPUTER SYSTEM, DATA RETRIEVAL METHOD AND DATABASE MANAGEMENT COMPUTER

(75) Inventors: Kazutomo Ushijima, Ebina (JP); Akira Shimizu, Tokyo (JP); Seisuke Tokuda, Ebina (JP); Michiko Tanaka, Yokohama (JP); Nobuo Kawamura, Atsugi (JP); Norihiro Hara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 86 days.

(21) Appl. No.: 13/814,989

(22) PCT Filed: Feb. 24, 2011

(86) PCT No.: PCT/JP2011/054175
§ 371 (c)(1),
(2), (4) Date: Feb. 8, 2013

(87) PCT Pub. No.: WO2012/032799
PCT Pub. Date: Mar. 15, 2012

(65) Prior Publication Data
US 2013/0159303 A1      Jun. 20, 2013

(30) Foreign Application Priority Data
Sep. 10, 2010 (JP) .................................. 2010-203377

(51) Int. Cl.
*G06F 17/30* (2006.01)

(52) U.S. Cl.
CPC .... *G06F 17/30283* (2013.01); *G06F 17/30339* (2013.01)

(58) Field of Classification Search
None
See application file for complete search history.

(56) References Cited

U.S. PATENT DOCUMENTS

| 2004/0186829 | A1 | 9/2004 | Suzuki et al. |
| 2007/0276785 | A1* | 11/2007 | Piedmonte ........................ 707/2 |
| 2008/0027905 | A1* | 1/2008 | Jensen et al. ...................... 707/2 |
| 2008/0027920 | A1 | 1/2008 | Schipunov et al. |

(Continued)

FOREIGN PATENT DOCUMENTS

| JP | 09-282287 A | 10/1997 |
| JP | 2004-280528 A | 10/2004 |

(Continued)

OTHER PUBLICATIONS

Hector Garcia-Molina et al.; "Database System Implementation", Prentice-Hall, Inc., ISBN:0-13-040264-8, pp. 388-389.

*Primary Examiner* — Robert Beausoliel, Jr.
*Assistant Examiner* — Pedro J Santos
(74) *Attorney, Agent, or Firm* — Mattingly & Malur, PC

(57) ABSTRACT

A computer system, comprising: a computer for outputting a result in response to a request; and a storage system for storing data output based on the request, the computer including: a request reception module for receiving the request; a processing procedure generation module for generating a plurality of processing procedures including an order of access to the data stored in the plurality of storage devices; a data division module for dividing the data; an information obtaining module for obtaining load information indicating a load condition of the storage system; an allotment determination module for determining, based on the obtained load information, allotments for allocating the divided data to be processed by the generated plurality of processing procedures; and a processing execution module for executing, based on the determined allotments, the generated plurality of processing procedures in parallel.

6 Claims, 9 Drawing Sheets

(56) References Cited

U.S. PATENT DOCUMENTS

2008/0189252 A1* 8/2008 Branscome et al. ............. 707/3
2009/0234868 A1* 9/2009 Venguerov ................. 707/100

FOREIGN PATENT DOCUMENTS

| JP | 2005-301353 A | 10/2005 |
| JP | 2009545060 | 12/2009 |

* cited by examiner

STORAGE CONFIGURATION INFORMATION

| STORAGE SECTION IDENTIFIER | UPPER-LIMIT THROUGHPUT VALUE | STORED DATA |
|---|---|---|
| S1 | 150 | T1 : CUSTOMER INFORMATION |
| S2 | 100 | T2 : PURCHASE INFORMATION |
| S3 | 50 | T3 : USAGE HISTORY |

FIG. 3A

STORAGE LOAD INFORMATION

| STORAGE SECTION IDENTIFIER | THROUGHPUT VALUE | TIME OF COLLECTION |
|---|---|---|
| S1 | 53 | 2010/04/01 15:00 |
| S2 | 10 | 2010/04/01 15:00 |
| S3 | 50 | 2010/04/01 15:00 |

FIG. 3B

CUSTOMER INFORMATION(T1)

| CUSTOMER ID (6011) | SEX (6012) | AGE GROUP (6013) | HOBBY (6014) |
|---|---|---|---|
| 1 | MALE | 20 | xxx |
| 2 | FEMALE | 30 | yyy |
| ⋮ | ⋮ | ⋮ | ⋮ |

PURCHASE HISTORY(T2)

| CUSTOMER ID (6021) | PURCHASE CATEGORY (6022) | PURCHASE AMOUNT (6023) |
|---|---|---|
| 1 | LIVING | xxxx |
| 2 | LIVING | yyyy |
| ⋮ | ⋮ | ⋮ |

USAGE HISTORY(T3)

| CUSTOMER ID (6031) | STORE USED (6032) | USAGE TIME (6033) |
|---|---|---|
| 1 | SHINJUKU | 2010/07/01 |
| 2 | SHINJUKU | 2010/07/05 |
| ⋮ | ⋮ | ⋮ |

```
SELECT   CUSTOMER ID, HOBBY, PURCHASE AMOUNT, USAGE TIME
FROM     CUSTOMER INFORMATION, PURCHASE HISTORY, USAGE HISTORY
WHERE    CUSTOMER INFORMATION. CUSTOMER ID = PURCHASE HISTORY. CUSTOMER ID
AND      CUSTOMER INFORMATION. CUSTOMER ID = USAGE HISTORY. CUSTOMER ID
AND      CUSTOMER INFORMATION. SEX = 'FEMALE'
AND      CUSTOMER INFORMATION. AGE GROUP = '30s'
AND      PURCHASE HISTORY. PURCHASE CATEGORY = 'LIVING'
AND      USAGE TIME. STORE USED = 'SHINJUKU'
```

COMPUTER SYSTEM, DATA RETRIEVAL METHOD AND DATABASE MANAGEMENT COMPUTER

CROSS-REFERENCE TO RELATED APPLICATIONS

The present application claims priority from Japanese patent application JP 2010-203377 filed on Sep. 10, 2010, the content of which is hereby incorporated by reference into this application.

BACKGROUND OF THE INVENTION

This invention relates to a database search processing system for combining a plurality of storage apparatus to perform database search processing, and more particularly, to a technology of improving search processing performance in the database search processing.

In recent years, in constructing an enterprise information system, for the purpose of reducing an equipment cost by sharing computer resources and of reducing an operational management cost by simplifying the operation, it is becoming common to construct an application system allowing logically centralized access to the plurality of storage apparatus storing various kinds of application data, to thereby enable application analysis processing with a combination of the application data.

In a case where the analysis processing is performed with the combination of the application data, the analysis processing is preferable to be executed in accordance with a processing procedure having the highest processing performance in consideration of the difference in performance of the plurality of storage apparatus storing the application data. However, when a significant load fluctuation or failure slowdown that is different from the prior expectations, or a significant change in configuration or performance characteristics occurs on the storage apparatus side, it is important that high processing performance be maintained by using performances of other storage apparatus to the fullest.

Even in an enterprise information system in which significant fluctuation in performance characteristics is expected, it is desired to realize a database management system capable of maximizing the processing performance at all times.

As a first prior art for maximizing the processing performance in a database for which a significant fluctuation in characteristics is expected in terms of performance of the storage apparatus, there has been known a method involving selecting one processing procedure providing the highest processing performance based on the processing contents expected in advance (see, for example, Japanese Patent Application Laid-open No. 2005-301353). There has also been known a method involving dynamically switching the processing procedure in the course of the processing so that the throughput is maximized based on the processing characteristics at the time of execution (see, for example, Japanese Patent Application Laid-open No. 9-282287).

SUMMARY OF THE INVENTION

In Japanese Patent Application Laid-open No. 2005-301353, the processing procedure providing the highest processing performance is selected based on the prior expectation and then the processing is executed. However, in a case where the significant load fluctuation or slowdown occurs during the execution of the processing, the optimal processing procedure is not necessarily selected, and hence the performance of a computer system cannot be used to the fullest.

Also, in Japanese Patent Application Laid-open No. 9-282287, the processing procedure providing the highest processing performance is selected during the execution of the processing, and hence the load fluctuation and slowdown at the time of execution of the processing can be addressed. However, only the selected one processing procedure is executed, and hence a part of processing resources that is closest to the performance limit becomes the bottleneck and the processing performances of the other computer resources are left unused.

In the method involving selecting only one processing procedure that provides the highest processing performance when performing search analysis processing with the application data dispersedly stored in the plurality of storage apparatus, the storage apparatus that is closest to the performance limit becomes the bottleneck and the processing performances of the other storage apparatus are left unused.

The representative one of inventions disclosed in this application is outlined as follows. There is provided a computer system, comprising: a computer for outputting a result in response to a request that has been received; and a storage system for storing data output based on the request. The computer including a first processor, a first memory coupled to the first processor, and a first network interface coupled to the first processor. The storage system including a second processor, a second memory coupled to the second processor, a plurality of storage devices coupled to the second processor, for storing a plurality of pieces of the data, and a second network interface coupled to the second processor. The computer including: a request reception module for receiving the request; a processing procedure generation module for generating, based on the request, a plurality of processing procedures including an order of access to the data stored in the plurality of storage devices; a data division module for dividing the data stored in the plurality of storage devices; an information obtaining module for obtaining load information indicating a load condition of the storage system; an allotment determination module for determining, based on the obtained load information, allotments for allocating the divided data to be processed by the generated plurality of processing procedures; and a processing execution module for executing, based on the determined allotments, the generated plurality of processing procedures in parallel.

According to the representative embodiment of this invention, there is realized the retrieval processing that uses the performance of the storage system to the fullest even in the environment in which storage devices having different performance characteristics are mixed.

BRIEF DESCRIPTION OF THE DRAWINGS

FIG. 3A is an explanatory diagram illustrating an example of a configuration information included in storage apparatus information according to the embodiment of this invention.

FIG. 3B is an explanatory diagram illustrating an example of load information included in the storage apparatus information according to the embodiment of this invention.

FIGS. 4A to 4C are explanatory diagrams illustrating examples of data to be retrieved according to the embodiment of this invention.

FIG. 7 is an explanatory diagram illustrating an example of a retrieval request used in the embodiment of this invention.

DETAILED DESCRIPTION OF THE PREFERRED EMBODIMENT

Figure 1:
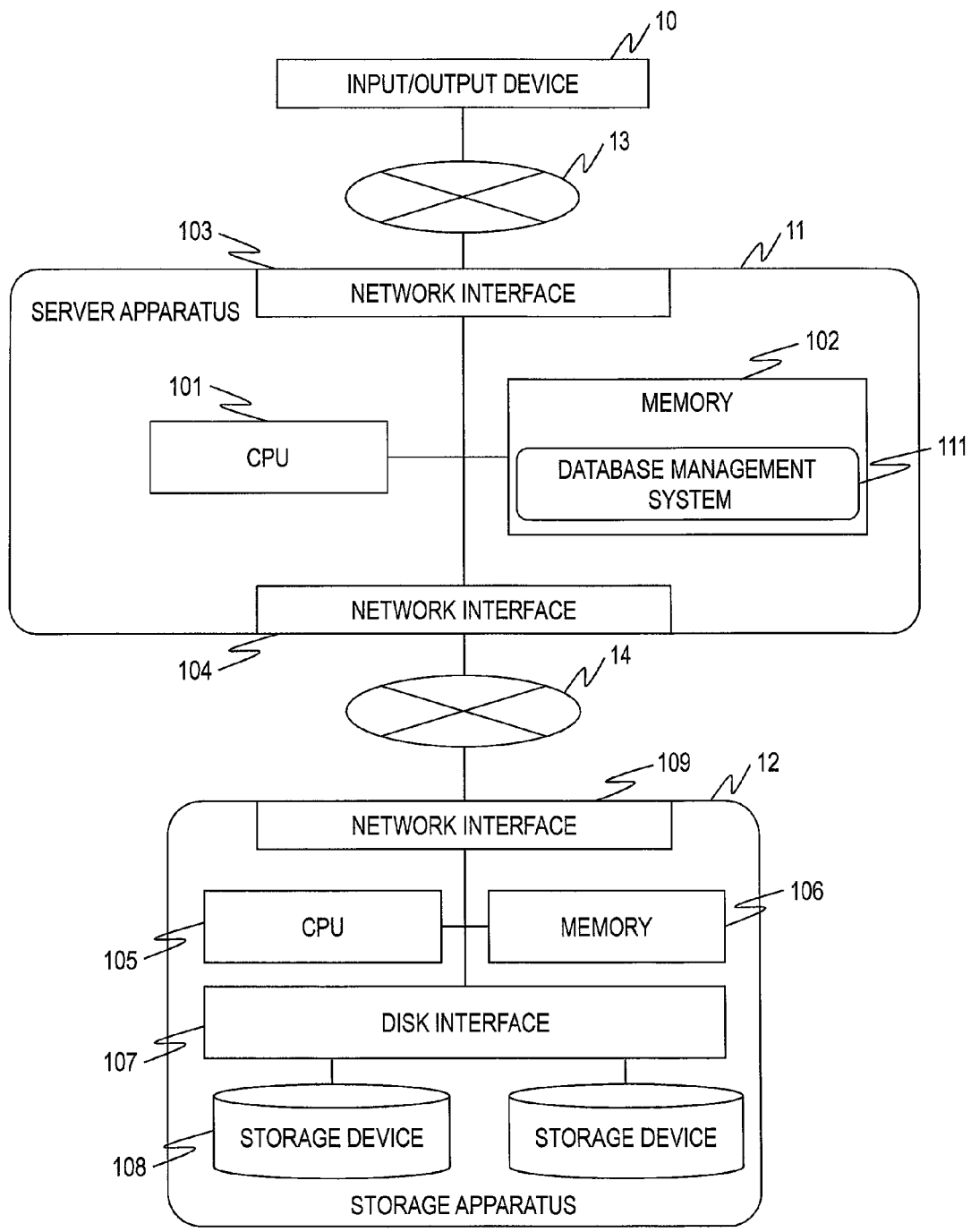
FIG. 1 is an explanatory diagram illustrating a configuration of a computer system according to an embodiment of this invention.

An embodiment of this invention is now described referring to the drawings.

FIG. 1 is an explanatory diagram illustrating a configuration of a computer system according to an embodiment of this invention.

The computer system according to the embodiment of this invention includes an input/output device 10, a server apparatus 11, and a storage apparatus 12.

The input/output device 10 and the server apparatus 11 are coupled to each other via a communication network 13. Also, the server apparatus 11 and the storage apparatus 12 are coupled to each other via a storage network 14.

The input/output device 10 transmits a system setting request and a retrieval request, which are input from a user, to the server apparatus 11 and displays a retrieval result, which is transmitted from the server apparatus. The input/output device 10 is implemented by, for example, a computer including a CPU (not shown) and a memory (not shown).

The server apparatus 11 transmits, based on the retrieval request input from the input/output device 10, a data read request to the storage apparatus 12 and returns, to the input/output device 10, a retrieval result in response to the retrieval request.

The server apparatus 11 includes a CPU 101, a memory 102, a network interface 103, and a network interface 104.

The CPU 101 executes various kinds of processing by executing programs stored in the memory 102. The server apparatus 11 may also be configured so as to include a plurality of CPUs 101 to execute a plurality of processes in parallel.

The memory 102 stores a program to be executed by the CPU 101 and information necessary for executing the program.

The memory 102 stores, as the program to be executed by the CPU 101, a database management system 111. Based on the retrieval request, the database management system 111 reads data from the storage apparatus 12, executes predetermined processing on the read data, and returns a result of the processing to the input/output device 10. Details of the database management system 111 are described later with reference to FIG. 2.

It should be noted that the memory 102 may also store other programs such as an application program.

The network interface 103 is an interface for coupling to the input/output device 10 via the communication network 13. The network interface 104 is an interface for coupling to the storage apparatus 12 via the storage network 14.

The storage apparatus 12 stores various kinds of data to be processed. The storage apparatus 12 reads specified data in response to the data read request transmitted from the server apparatus 11, and transmits the read data to the server apparatus 11.

The storage apparatus 12 includes a CPU 105, a memory 106, a disk interface 107, storage devices 108, and a network interface 109.

The CPU 105 executes various kinds of processing by executing programs stored in the memory 106.

The memory 106 stores a program to be executed by the CPU 105 and information necessary for executing the program.

The disk interface 107 is an interface for accessing the storage devices 108.

The storage devices 108 store various kinds of data to be processed. Each of the storage devices 108 may be a storage device such as a hard disk drive (HDD), an optical disc drive, and a semiconductor storage device. It should be noted that a disk array may be constituted of a plurality of storage devices 108.

In the embodiment, one or more data storage sections 123 (see FIG. 2) are generated from storage areas of the storage devices 108.

It should be noted that the data storage sections 123 (see FIG. 2) are generated on the storage areas of different storage devices 108, respectively. In other words, the storage devices 108 are configured so that the storage area of one storage device 108 is not used by a plurality of data storage sections 123. In this manner, in a case where the plurality of data storage sections 123 (see FIG. 2) are accessed, different storage devices 108 are accessed, respectively. Therefore, the load is not concentrated on one storage device 108.

It should be noted that the computer system may be configured to include a storage system consisting of a plurality of the storage apparatus 12.

Figure 2:
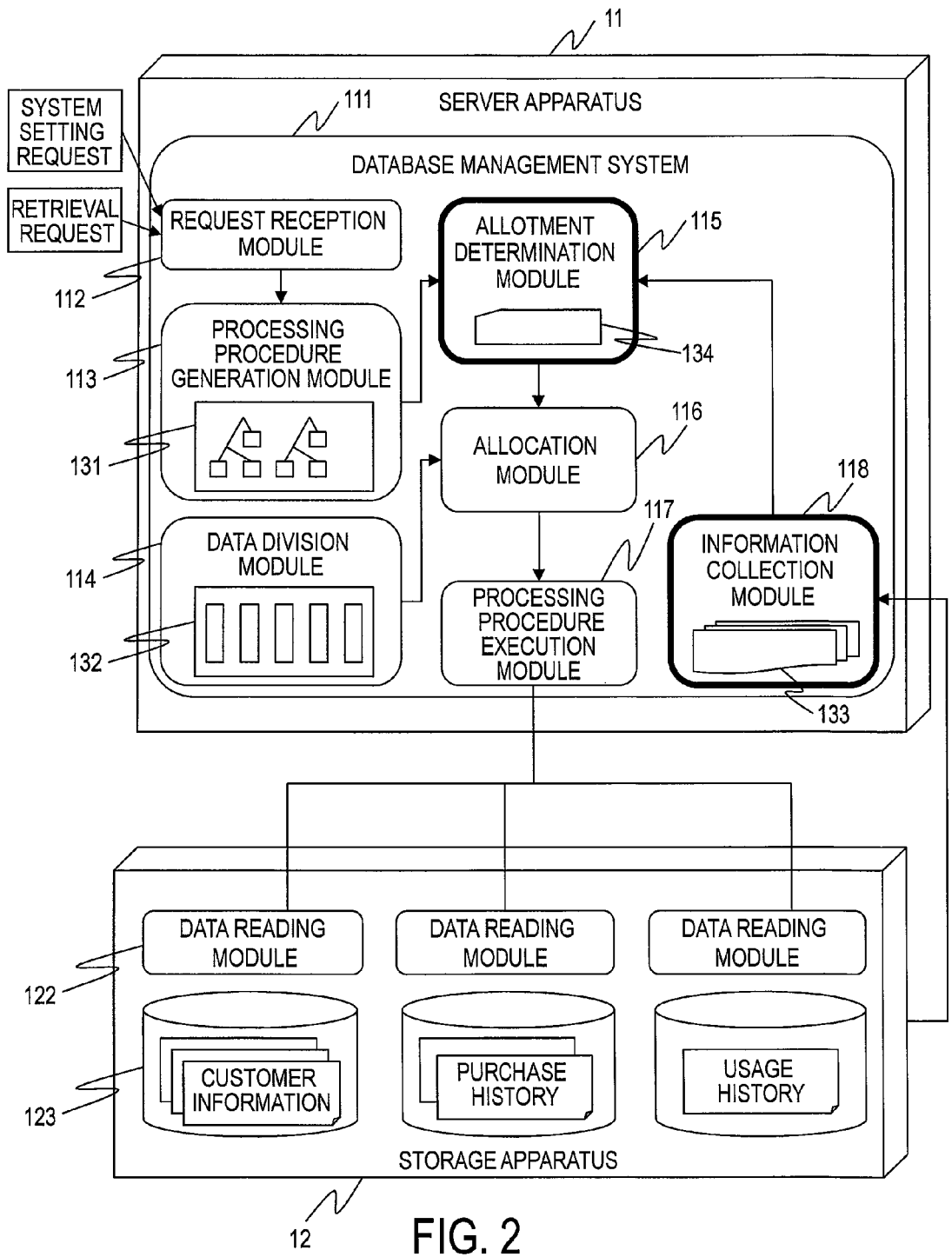
FIG. 2 is an explanatory diagram illustrating a software configuration according to the embodiment of this invention.

FIG. 2 is an explanatory diagram illustrating a software configuration according to the embodiment of this invention.

The database management system 111 according to the embodiment of this invention includes a request reception module (retrieval request reception module) 112, a processing procedure generation module (processing procedure candidate set generation module) 113, a data division module (data-to-be-processed division module) 114, an allotment determination module (divided data allotment determination module) 115, an allocation module (processing procedure-divided data allocation module) 116, a processing procedure execution module (processing procedure concurrent execution module) 117, and an information collection module (storage apparatus information collection module) 118.

It should be noted that portions framed by a bold line indicate portions for executing characteristic processing of this invention.

The request reception module 112 receives the retrieval request from the input/output device 10, and outputs the received retrieval request to the processing procedure generation module 113. The request reception module 112 also receives the system setting request from the input/output device 10 and adjusts processing timing of components included in the database management system 111.

The processing procedure generation module 113 generates a plurality of processing procedures based on the retrieval request input from the request reception module 112. The generated processing procedures are hereinafter also referred to as processing procedure candidates. The processing procedure generation module 113 generates a candidate set 131, which is a set of a plurality of processing procedure candidates. The processing procedure generation module 113 further outputs the generated candidate set 131 to the allotment determination module 115.

It should be noted that details of the candidate set 131 are described later with reference to FIG. 7.

The data division module 114 divides a part or all of the data to be processed, which is stored in the storage apparatus 12, into a plurality of pieces to generate a plurality of pieces of divided data. Further, the data division module 114 generates a divided data set 132, which is a set of the pieces of divided data. The data division module 114 outputs the generated divided data set 132 to the allocation module 116.

In the embodiment of this invention, the data to be processed is divided based on a preset division method. It should be noted that the division method is set by a division specification included in the system setting request. The division specification is described later with reference to FIG. 5.

The information collection module 118 communicates to/from the storage apparatus 12 to collect storage apparatus information 133 including information on the storage apparatus 12. The information collection module 118 also outputs the collected storage apparatus information 133 to the allotment determination module 115.

The storage apparatus information 133 according to the embodiment of this invention at least includes configuration information, which is information on a configuration of the storage apparatus 12, and load information, which is information on a load condition of the storage apparatus 12. It should be noted that the storage apparatus information 133 may also include other information.

The allotment determination module 115 refers to the candidate set 131 input from the processing procedure generation module 113 and the storage apparatus information 133 input from the information collection module 118 to determine allotments of the divided data to be allocated to the plurality of processing procedures included in the candidate set 131. The allotment determination module 115 outputs, to the allocation module 116, allotment information 134 including the determined allotments.

The allocation module 116 allocates, based on the allotment information 134 input from the allotment determination module 15, the divided data included in the divided data set 132 to the processing procedures included in the candidate set 131. Further, the allocation module 116 outputs, to the processing procedure execution module 117, the plurality of processing procedures to which the divided data is allocated.

The processing procedure execution module 117 follows the plurality of processing procedures, which is input from the allocation module 116 and to which the divided data is allocated, to issue a plurality of data read requests to the storage apparatus 12.

The storage apparatus 12 according to the embodiment includes data reading modules 122 and the data storage sections 123.

Each of the data reading modules 122 is a program stored in the memory 106, and reads data from the data storage section 123 in response to the data read request, which is issued by the processing procedure execution module 117, and returns the read data to be processed to the server apparatus 11.

Each of the data storage sections 123 is a storage area storing the data to be processed, and stores various kinds of data to be processed. In the example illustrated in FIG. 2, customer information, purchase history, and usage history are stored in the data storage sections 123, respectively.

The database management system 111 according to the embodiment of this invention determines, based on the storage apparatus information 133, the allotments of the divided data to be allocated to the plurality of processing procedures. In this manner, the plurality of processing procedures are executed in parallel in accordance with the allotments of the divided data. The allotments of the divided data are also determined so as not to exceed upper-limit load values set in the data storage sections 123.

FIG. 3A is an explanatory diagram illustrating an example of the configuration information included in the storage apparatus information 133 according to the embodiment of this invention. FIG. 3B is an explanatory diagram illustrating an example of the load information included in the storage apparatus information 133 according to the embodiment of this invention.

Configuration information 401 stores information on a configuration of the data storage sections 123 included in the storage apparatus 12. Specifically, the configuration information 401 includes a storage section identifier 4011, an upper-limit throughput value 4012, and stored data 4013.

The storage section identifier 4011 is an identifier for identifying a data storage section 123. The upper-limit throughput value 4012 represents the maximum number of the data read requests that can be processed per unit time by the data storage section 123 corresponding to the storage section identifier 4011, in other words, an upper-limit value of the throughput. The stored data 4013 is information on the data to be processed, which is stored in the data storage section 123 corresponding to the storage section identifier 4011.

In the configuration information 401 illustrated in FIG. 3A, it can be seen that the data storage section 123 having the upper-limit throughput value 4012 of "60 records/second" stores the customer information, the data storage section 123 having the upper-limit throughput value 4012 of "10 records/second" stores the purchase history, and the data storage section 123 having the upper-limit throughput value 4012 of "50 records/second" stores the usage history.

Load information 402 stores the load information of the data storage sections 123 included in the storage apparatus 12. Specifically, the load information 402 includes a storage section identifier 4021, a throughput value 4022, and a time of collection 4023.

The storage section identifier 4021 is an identifier for identifying a data storage section 123. The throughput value 4022 is the number of the data read requests that are processed per unit time by the data storage section 123 corresponding to the storage section identifier 4021 (throughput). The time of collection 4023 is the time when the value corresponding to the throughput value 4022 is collected.

In the load information 402 illustrated in FIG. 3B, it can be seen that the data storage section 123 having the storage section identifier 4021 of "S1" has a throughput of "53 records/second", the data storage section 123 having the storage section identifier 4021 of "S2" has a throughput of "10 records/second", and the data storage section 123 having the storage section identifier 4021 of "S3" has a throughput of "50 records/second".

FIGS. 4A to 4C are explanatory diagrams illustrating examples of data to be retrieved according to the embodiment of this invention.

In the embodiment of this invention, table data including customer information 601, purchase history 602, and usage history 603 is assumed as the data to be retrieved.

The customer information 601 stores various kinds of information of customers. For example, the customer information 601 stores records including information on "customer ID 6011, sex 6012, age group 6013, and hobby 6014."

The table representing the customer information is hereinafter also referred to as the customer information T1 (601).

The purchase history 602 stores the purchase history of the customers. For example, the purchase history 602 stores records including information on "customer ID 6021, purchase category 6022, and purchase amount 6023." The table representing the purchase history is hereinafter also referred to as the purchase history T2 (602).

The usage history 603 stores the usage history, such as the store used by each of the customers. For example, the usage history 603 stores records including information on "customer ID 6031, store used 6032, and usage time 6033." The table representing the usage history is hereinafter also referred to as the usage history T3 (603).

It should be noted that the customer information 601, the purchase history 602, and the usage history 603 may also include other information.

Figure 5:
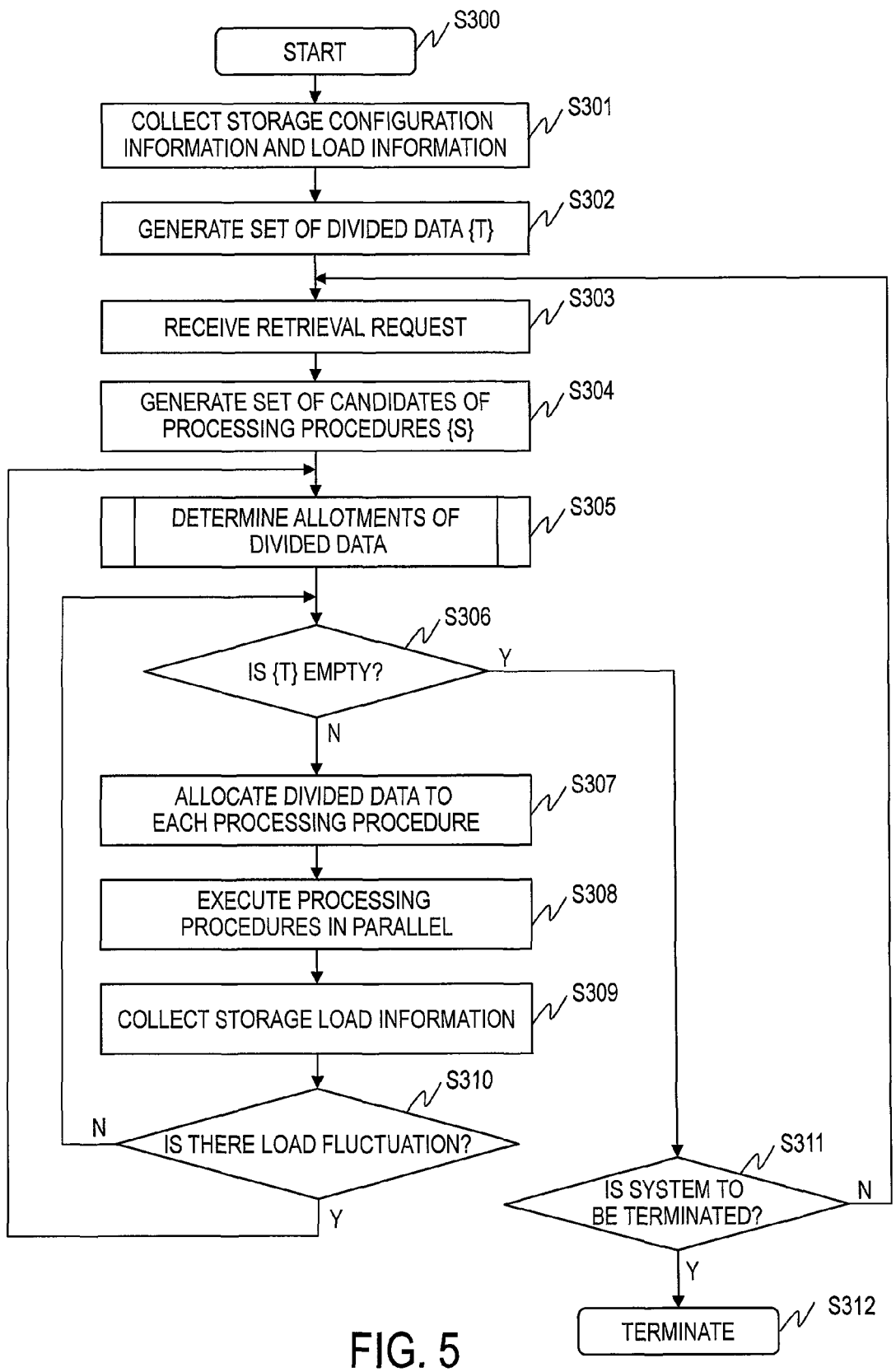
FIG. 5 is a flowchart illustrating retrieval processing executed by a database management system according to the embodiment of this invention.

FIG. 5 is a flowchart illustrating retrieval processing executed by the database management system 111 according to the embodiment of this invention.

After the database management system 111 according to the embodiment of this invention starts the processing (Step 300) and before a retrieval request is received from the input/output device 10, the information collection module 118 executed by the CPU 101 collects in advance the storage apparatus information 133 including the configuration information 401, the load information 402, and the like (Step 301). It should be noted that the CPU 101 may periodically execute the information collection module 118, or execute the information collection module 118 at predetermined timing, such as when the configuration of the storage apparatus 12 is changed.

The data division module 114 executed by the CPU 101 divides, based on the preset division specification, a part or all of the data to be processed, which is stored in the data storage sections 123, to thereby generate the divided data set {T} 132 (Step 302). Thereafter, the database management system 111 stands by until a retrieval request is received.

The method of generating the divided data set {T} 132 may include not only a method of dividing the data to be processed in units of a record, but also a method of dividing the data to be processed in units of a block (a plurality of records). At this time, also in the method of dividing the data to be processed in units of a block, the number of records constituting a block may be equal or unequal. Further, various embodiments may be contemplated, such as dividing all the data to be processed at the start of the processing, or dividing the data to be processed while dynamically changing the number of records constituting a block during the retrieval processing.

The division specification as used herein is information for generating the divided data set {T} 132, and is information included in the system setting request.

Figure 6:
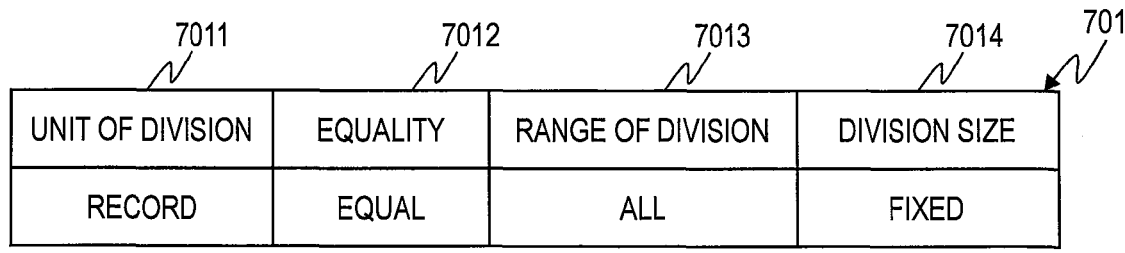
FIG. 6 is an explanatory diagram illustrating an example of a division specification included in a system setting request according to the embodiment of this invention.

FIG. 6 is an explanatory diagram illustrating an example of the division specification included in the system setting request according to the embodiment of this invention.

A division specification 701 illustrated in FIG. 6 stores the division specification for specifying the method of generating the divided data set {T} 132.

Specifically, the division specification 701 includes a unit of division 7011, equality 7012, a range of division 7013, and a division size 7014.

The unit of division 7011 represents a unit by which the data to be processed is divided. The equality 7012 represents, in a case where the data to be processed is to be divided, whether the data to be processed is to be divided equally or unequally. The range of division 7013 represents a range of the data to be divided. The division size 7014 represents whether or not to change the unit of division of the data to be processed during the processing.

In the example illustrated in FIG. 6, it is specified that the unit of division is in units of a record, that the data is to be divided equally, that all the data to be processed is to be divided, and further that the unit of division is not to be changed during the processing.

The description now returns to the flowchart of FIG. 5.

Next, the request reception module 112 executed by the CPU 101 receives a retrieval request from the input/output device 10 (Step 303). The received retrieval request is output to the processing procedure generation module 113.

In the embodiment of this invention, the retrieval request is described in an SQL sentence used in common database management systems. It should be noted that the description syntax of the SQL sentence is disclosed in SQL 99 set by the International Organization for Standards (ISO)/International Electrotechnical Commission (IEC) in 1999 and the like.

FIG. 7 is an explanatory diagram illustrating an example of the retrieval request used in the embodiment of this invention.

The retrieval request illustrated in FIG. 7 searches the three types of data to be processed, which are illustrated in FIGS. 4A to 4C.

Specifically, the retrieval request is intended "to extract, from among customer information satisfying specific conditions, such customer information that specified conditions are satisfied for the usage history and the purchase history having the same customer ID, respectively." More specifically, the retrieval request specifies "to extract the customer information for female customers in their 30s who have usage history of visiting to the shop in Shinjuku and the purchase history in the 'living' category."

Further, in the embodiment of this invention, it is assumed that, based on the conditions regarding the sex and age group (customer information), the purchase category (purchase history), and the store used (usage history), the information is narrowed down to ¼, ⅛, and ⅕, respectively. In other words, female customers in their 30s constitute ¼ of all the customers included in the customer information, and records having the purchase history in which the purchase category is "living" constitute ⅛ of all records. Further, records having the usage history in which the store used is "Shinjuku" constitute ⅕ of all records.

The description now returns to the flowchart of FIG. 5.

Next, the processing procedure generation module 113 executed by the CPU 101 generates a plurality of processing procedure candidates based on the retrieval request input from the request reception module 112, and generates a candidate set {S} 131 constituted of the generated plurality of processing procedure candidates (Step 304).

It should be noted that Hector Garcia-Molina, Jeffrey D. Ullman, and Jennifer D. Widom "Database System Implementation", Prentice Hall, p. 388-389 discloses a method of counting the processing procedure candidates from the SQL sentence, and specifically describes counting all the processing procedure candidates for processing the specified SQL sentence by the Bottom-up method.

Figure 8A:
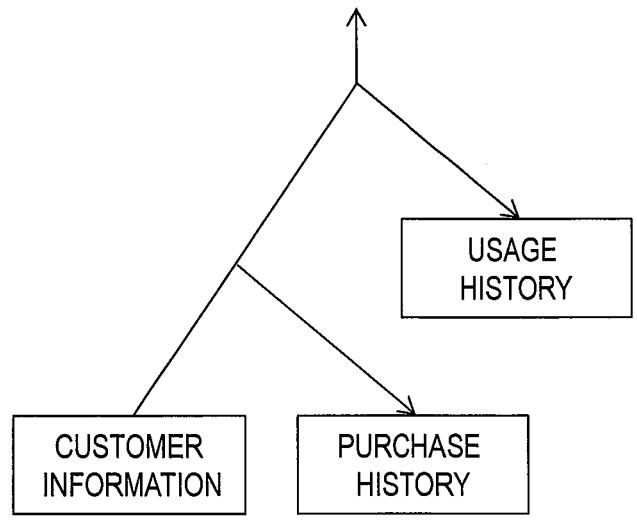
FIGS. 8A and 8B are diagrams illustrating examples of processing procedure candidates generated by a processing procedure generation module according to the embodiment of this invention.
Figure 8B:
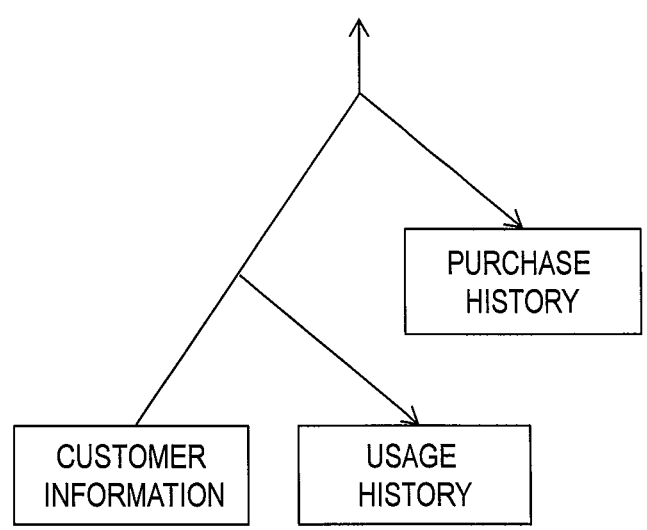

FIGS. 8A and 8B are diagrams illustrating examples of the processing procedure candidates generated by the processing procedure generation module 113 according to the embodiment of this invention.

The processing procedure candidates illustrated in FIGS. 8A and 8B represent the processing procedures in tree structures.

The processing procedure candidate illustrated in FIG. 8A is a processing procedure in which "customer IDs of records in which the sex is 'female' and the age group is '30s' are first extracted from the customer information, records having the purchase history in which the purchase category is 'living' are extracted from the customers corresponding to the extracted customer IDs, and further, records having the usage history in which the store used is 'Shinjuku' are extracted from the customers corresponding to the extracted customer IDs."

The processing procedure candidate illustrated in FIG. 8B is a processing procedure in which "customer IDs of records in which the sex is 'female' and the age group is '30s' are first extracted from the customer information, records having the usage history in which the store used is 'Shinjuku' are extracted from the customers corresponding to the extracted customer IDs, and further, records having the purchase history in which the purchase category is 'living' are extracted from the customers corresponding to the extracted customer IDs."

The description now returns to the flowchart of FIG. 5.

Next, the allotment determination module 115 executed by the CPU 101 determines the allotments of the divided data to be allocated to the processing procedure candidates included in the candidate set {S} 131 (Step 305).

The processing of determining the allotments is described later with reference to FIG. 9.

The allotment determination module 115 executed by the CPU 101 determines whether or not there is divided data that is yet to be allocated in the divided data set {T} 132 (Step 306). Specifically, it is determined whether or not the divided data set {T} 132 is empty.

In a case where it is determined that there is divided data to be allocated, the allocation module 116 executed by the CPU 101 allocates the divided data to the processing procedure candidates based on the determined allotments (Step 307).

The processing procedure execution module 117 executed by the CPU 101 executes the plurality of processing procedure candidates to which the divided data is allocated (Step 308). In this manner, processes that follow the plurality of processing procedure candidates are executed concurrently in parallel.

The information collection module 118 executed by the CPU 101 collects the load information 402 after the start of execution of the processing procedures (Step 309). The collected load information 402 is output to the allotment determination module 115. The collected load information 402 is output to the allotment determination module 115.

It should be noted that the load information 402 may be collected after the start of the processing, periodically after the start of the processing, or at other timing.

The allotment determination module 115 refers to newly input load information 402, and compares the newly input load information 402 with the load information 402 used last time in determining the allotments (Step 305), to thereby determine whether or not there is a significant load fluctuation in the data storage sections 123 (Step 310).

For example, it is determined whether or not at least one of conditions that the difference in time of collection is a threshold value or lower or that the fluctuation width of the load is a threshold value or lower is satisfied. In a case where one of the conditions is satisfied, it is determined that there is no significant load fluctuation in the data storage sections 123. On the other hand, in a case where the difference in time of collection is the threshold value or larger and the load fluctuation width is the threshold value or larger, it is determined that there is a significant load fluctuation in the data storage sections 123.

It should be noted that the threshold value for the difference in time of collection and the threshold value for the variation width of the load may be included in the system setting request or originally held by the database management system 111.

The database management system 111 according to the embodiment of this invention monitors the load condition of the storage apparatus 12 during the execution of the processing. In this manner, when the load on the storage apparatus 12 increases, the database management system 111 may select the processing procedure candidate corresponding to the load condition of the storage apparatus 12 to dynamically change the allotments of the divided data.

In a case where it is determined that there is no significant load fluctuation in the data storage sections 123, the processing returns to Step 306 in which the CPU 101 executes the same processing (Steps 306 to 310).

In a case where it is determined that there is a significant load fluctuation in the data storage sections 123, the processing returns to Step 305 in which the CPU 101 determines the allotments again (Step 305). In other words, the allotments of the divided data to be allocated to the processing procedure candidates are reviewed.

In a case where it is determined in Step 306 that there is no divided data to be allocated, the CPU 101 determines whether or not the retrieval processing is to be ended and the system is to be terminated (Step 311). For example, in a case where an instruction to terminate the system is input from the input/output device 10, it is determined that the system is to be terminated.

In a case where it is determined that the system is not to be terminated, the processing returns to Step 305 in which the CPU 101 waits to receive a new retrieval request. In a case of receiving a new retrieval request, the CPU 101 repeatedly executes the same processing (Steps 303 to 311).

In a case where it is determined that the system is to be terminated, the CPU 101 terminates the system (Step 312).

In the embodiment of this invention, the retrieval processing is executed in the plurality of processing procedures in order to use the performance of the storage apparatus 12 to the fullest. At this time, the data is allotted to the plurality of processing procedures in consideration of the load condition of the storage apparatus 12 and further so that the throughput of the storage apparatus 12 is maximized. In this manner, the performance of the storage apparatus 12 may be used to the fullest.

Conventionally, only one processing procedure is selected, and hence the order of access to the data storage sections 123 has always been the same. Therefore, there has been a case where the load on a specific data storage section 123 becomes heavy and the loads on the other data storage sections 123 become light. At such time, the data input/output with respect to the data storage section 123 with the heavy load may become a bottleneck to deteriorate the performance. In the embodiment of this invention, the plurality of processing procedures having different orders of access to the data storage sections 123 are executed simultaneously, and hence the loads on the data storage sections 123 are distributed so that it is possible to avoid a situation in which the performances of specific data storage sections 123 are left unused. In addition, the allotments of the divided data for the plurality of processing procedures to be executed simultaneously are determined through use of the following method, to thereby use the performances of the data storage sections 123 to the fullest.

A description is given next of the processing of determining the allotments of the divided data to be allocated to the processing procedure candidates, which is executed in Step 305.

In the processing in Step 305 according to the embodiment of this invention, linear programming is used. Linear programming is a method of determining a value for maximizing (or minimizing) an objective function under a constraint.

In the embodiment of this invention, under a constraint that the load on the storage apparatus 12 does not exceed the upper-limit value, the allotments of the divided data are calculated so that an objective function representing all data to be processed by executing a search by the plurality of processing procedures becomes maximum.

Figure 9:
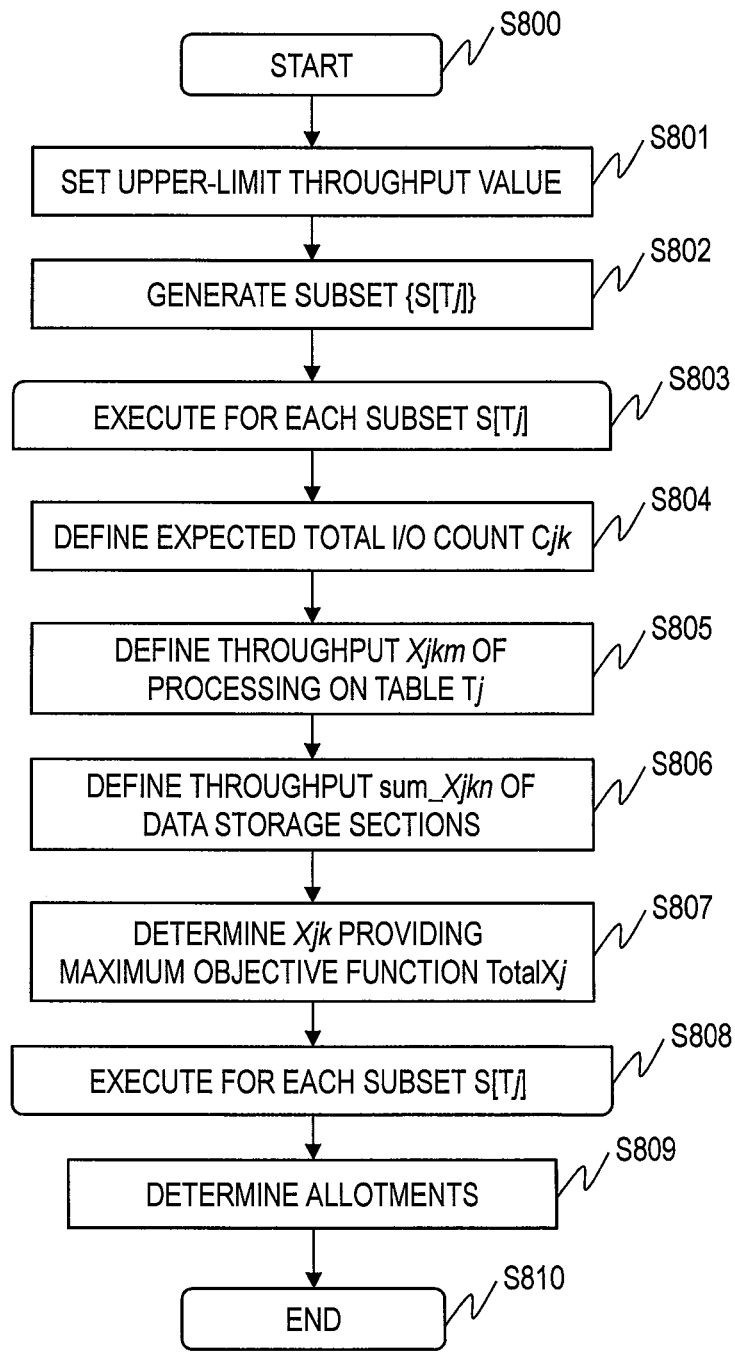
FIG. 9 is a flowchart illustrating processing executed by an allotment determination module, which is executed by the CPU 101 according to the embodiment of this invention.

FIG. 9 is a flowchart illustrating processing executed by the allotment determination module 115, which is executed by the CPU 101 according to the embodiment of this invention. This processing corresponds to the processing in Step 305 of FIG. 5. It should be noted that the processing of FIG. 9 is executed by the allotment determination module 115, which is executed by the CPU 101.

Steps 801 to 806 are processing of determining the objective function and the constraint.

First, the allotment determination module 115 sets the upper-limit throughput value max_Xn set to the n-th data storage section 123 (Step 801).

Specifically, the allotment determination module 115 refers to the upper-limit throughput value 4012 of the configuration information 401 included in the input storage apparatus information 133 to set the value stored in the upper-limit throughput value 4012 to the upper-limit throughput value max_Xn. It should be noted that n represents a letter for identifying the data storage section 123.

The allotment determination module 115 generates a subset {S[Tj]} from the candidate set {S} (Step 802).

Specifically, from among the processing procedure candidates si∈{S}, the allotment determination module 115 groups together the processing procedure candidates that first access the common data to be processed (processing start table Tj) to generate the subset {S[Tj]}. In other words, in the embodiment of this invention, the subset {S[Tj]} including, as its elements, the processing procedure candidates that first process the common data to be processed is generated. j is a letter for identifying the subset, and as many subsets as the number of tables (data to be processed) are present.

It should be noted that, in a case where the processing procedures with different processing start tables Tj are executed in parallel, the processing results may overlap. Therefore, in the embodiment of this invention, the processing procedure candidates having the same processing start table Tj are grouped together to ensure consistency in the processing.

Thereafter, the processing of Steps 804 to 807 is repeatedly executed for each of the subsets {S[Tj]} (Step 803).

The allotment determination module 115 defines an expected I/O count Cjk for each element (processing procedure candidate) included in the subset S[Tj] (Step 804).

Specifically, the allotment determination module 115 defines, for the processing procedure candidate Sjk∈S[Tj], which is an element of the subset S[Tj], the expected total I/O count to occur in the processing procedure candidate Sjk as Cjk. The letter k is a natural number of 1 to nj and represents the number of elements included in the subset. In addition, nj is the number of elements of the subset S[Tj].

The allotment determination module 115 defines, for each processing procedure candidate Sjk included in the subset S[Tj], a throughput Xjkm of the processing on each table (data to be processed) (Step 805).

Specifically, the allotment determination module 115 defines, in a case where the processing is started from the processing start table Tj with a load of a throughput Xjk, the throughput of the processing on the m-th table as Xjkm. In other words, the load in the case of processing the m-th data to be processed in the processing procedure candidate Sjk is defined. m is a letter representing the order of processing in the processing procedure candidate Sjk.

It should be noted that the throughput Xjk is an arbitrary variable.

For example, the allotment determination module 115 may multiply the throughput Xjk added to the processing start table Tj by a rate of narrowing down by the condition in the inquiry processing applied in the course of the processing, to thereby calculate the throughput of the processing on the m-th table (data to be processed).

The allotment determination module 115 defines a sum of throughputs sum_Xjk of the data storage sections 123 in a case where all the processing procedure candidates included in the subset S[Tj] are executed in parallel (Step 806).

Specifically, the following processing is executed.

First, the allotment determination module 115 refers to the configuration information 401 included in the input storage apparatus information 133 to check a table (data to be processed) Tjkm stored in the n-th data storage section 123.

Next, the allotment determination module 115 adds the throughputs Xjkm of the tables stored in the data storage sections 123 to obtain sum_Xjkm. In other words, the sum of the throughputs of all tables (data to be processed) stored in the data storage sections 123 is defined as sum_Xjkm.

The allotment determination module 115 determines a variable Xjk that provides the maximum value of objective functions TotalXj under the constraint (Step 807). In other words, linear programming is used to calculate the variable Xjk.

The constraint is expressed by Equation (1), and the objective function TotalXj is expressed by Equation (2).

$$\text{Total } Xj = \sum_{k=\{1 \ldots nj\}} \frac{\text{sum\_Xjkn}}{Cjk} \quad (1)$$

$$\text{sum\_Xjkn} < \text{max\_Xn} \quad (2)$$

In other words, Equations (1) and (2) are equations for determining, in a range that does not exceed the upper-limit throughput value set to each of the data storage sections 123, the allotments that provide the maximum total throughput in the case where the processing procedure candidates included in the candidate set are executed in parallel.

The throughput that provides the maximum objective function TotalXj is defined as Xjk_max.

The allotment determination module 115 repeatedly executes the processing of Steps 804 to 807 for each of the subsets S[Tj] (Step 808).

After executing the processing for all the subsets S[Tj], the allotment determination module 115 determines the allotments based on the total throughput TotalXj in each of the subsets (Step 809), and ends the processing (Step 810).

Specifically, the following processing is executed.

First, the allotment determination module 115 selects the subset S[Tj] having the maximum value of the total throughput TotalXj.

Next, the allotment determination module 115 determines the ratio providing the throughput Xjk_max in the selected subset S[Tj] as the allocation ratio of the divided data to the processing procedure candidates Sjk included in the selected subset S[Tj].

As described above, in the embodiment of this invention, the allotment determination module 115 selects the plurality of processing procedures in the range that does not exceed performance limits of the data storage sections 123 so as to provide the maximum value of the total throughput of the data storage sections 123. Further, the allotments of the divided data to be allocated to the plurality of processing procedures are determined in the range that does not exceed the performance limits of the data storage sections 123 so as to provide the maximum value of the total throughput of the data storage sections 123. Therefore, the plurality of processing procedures are executed based on the determined allotments, to thereby realize the retrieval processing that uses the performance of the storage apparatus 12 to the fullest.

Next, the processing of FIG. 9 is described by means of a specific example. It should be noted that for simplicity, the description is given based on the following assumption.

The data to be processed are the customer information T1 (601), the purchase history T2 (602), and the usage history T3 (603). Further, the customer information T1 (601), the purchase history T2 (602), and the usage history T3 (603) are stored in different data storage sections 123, respectively, as illustrated in FIG. 2. In other words, as illustrated in FIG. 3A, the customer information T1 (601) is stored in the data storage section 123 having the storage section identifier 4011 of "S1", the purchase history T2 (602) is stored in the data storage section 123 having the storage section identifier 4011 of "S2", and the usage history T3 (603) is stored in the data storage section 123 having the storage section identifier 4011 of "S3".

At this time, in Step 304, six possible processing procedure candidates as a combination of orders of reference to the three kinds of data to be processed are generated.

A description is now given of the processing executed by the allotment determination module 115 under the above-mentioned assumptions.

In Step 801, the allotment determination module 115 refers to the configuration information 401 to set an upper-limit throughput value max_X1 of the data storage section 123 in which the customer information T1 (601) is stored, an upper-limit throughput value max_X2 of the data storage section 123 in which the purchase history T2 (602) is stored, and an upper-limit throughput value max_X3 of the data storage section 123 in which the usage history T3 (603) is stored to "150", "100", and "50", respectively.

In Step 802, the allotment determination module 115 generates a subset S[T1] having the customer information T1 (601) as the processing start table, a subset S[T2] having the purchase history T2 (602) as the processing start table, and a subset S[T3] having the usage history T3 (603) as the processing start table.

The subsets S[T1], S[T2], and S[T3] include the following elements (processing procedure candidates).
S[T1]={s11, s12}
S[T2]={s12, s22}
S[T3]={s31, s32}

The elements (processing procedure candidates) included in the subsets S[T1], S[T2], S[T3] are as follows.
[Case where Processing Start Table is Customer Information T1]
Processing procedure candidate s11: customer information→purchase history→usage history: allocated throughput: X11
Processing procedure candidate s12: customer information→usage history→purchase history: allocated throughput: X12
[Case where Processing Start Table is Purchase History T2]
Processing procedure candidate s21: purchase history→customer information→usage history: allocated throughput: X21
Processing procedure candidate s22: purchase history→usage history→customer information: allocated throughput: X22
[Case where Processing Start Table is Usage History T3]
Processing procedure candidate s31: usage history→purchase history→customer information: allocated throughput: X31
Processing procedure candidate s32: usage history→customer information→purchase history: allocated throughput: X32

It should be noted that the allocated throughput is a variable relating to an amount of data to be allotted to each of the processing procedures.

Thereafter, the processing of Steps 804 to 807 is repeatedly executed for each of the subsets, but for simple description, the subset S[T1] having the customer information T1 (601) as the processing start table is described.

In Step 804, the allotment determination module 115 defines the expected total I/O counts in the processing procedure candidates s11 and s12 included in the subset S[T1] as c11 and c12, respectively. It should be noted that the expected total I/O counts may be calculated based on the processing procedure candidates s11 and s12. The allotment determination module 115 defines the calculated expected total I/O count as c11 and c12, respectively.

In Step 805, the allotment determination module 115 defines processing throughputs to be allocated to the processing procedure candidates s11 and s12 as X11 and X12, respectively. Further, the allotment determination module 115 defines load throughputs in the tables processed in order in the processing procedure candidate s11 as X111, X112, and X113, respectively, and defines load throughputs in the tables processed in order in the processing procedure candidate s12 as X121, X122, and X123, respectively.

In the case of the embodiment of this invention, the customer information T1 (601), the purchase history T2 (602), and the usage history T3 (603) are stored in different data storage sections 123, respectively. In other words, the customer information T1 (601), the purchase history T2 (602), and the usage history T3 (603) correspond to the data storage sections 123 on a one-to-one basis. Therefore, the throughput of each of the data storage sections 123 and the throughput of each of the tables (data to be processed) may be treated as equivalents. In other words, the throughputs of the data storage sections 123 are expressed by the processing throughputs X11 and X12 assigned to the processing procedure candidates.

Therefore, in Step 806, the allotment determination module 115 may define sum_X111, sum_X112, and sum_X113 as in Equations (3) to (5).

$$\text{sum\_}X111 = X111 + X121 \tag{3}$$

$$\text{sum\_}X112 = X112 + X123 \tag{4}$$

$$\text{sum\_}X113 = X113 + X122 \tag{5}$$

It is assumed that load throughputs Xjkm are expressed by using the processing throughputs X11 and X12 as in Equations (6) to (8) below.

$$\text{sum\_}X111 = X11 + X12 \tag{6}$$

$$\text{sum\_}X112 = X11 + \frac{X12}{8} \tag{7}$$

$$\text{sum\_}X113 = \frac{X11}{5} + X12 \tag{8}$$

In Step 807, the allotment determination module 115 calculates X11 and X12 that satisfy the constraints expressed by Equations (9) to (11) (in other words, in the range in which the sum of load throughputs does not exceed the upper-limit throughput value) and that provides the maximum TotalXj expressed by Equation (12).

$$\text{constraint 1: } X11 + X12 < 150 \qquad (9)$$

$$\text{constraint 2: } X11 + \frac{X12}{8} < 100 \qquad (10)$$

$$\text{constraint 3: } \frac{X11}{5} + X12 < 50 \qquad (11)$$

$$\text{objective function: } \frac{X11}{c11} + \frac{X12}{c12} = \frac{X11}{3.375} + \frac{X12}{5.5625} \qquad (12)$$

In this case, the solutions providing the maximum objective function are calculated as: X11_max=3.846 and X12_max=49.23. At this time, the value of an objective function TotalX1 is 9.990.

The description has been given above of the case where the processing of Steps 804 to 807 is executed for the subset S[T1].

The same processing is executed also for the subset S[T2], to thereby obtain the following constraints and objective function.

[Case of Processing Start Table: Purchase History T2]

$$\text{constraint 1: } X212 + X223 = X21 + \frac{X22}{8} < 150 \qquad (13)$$

$$\text{constraint 2: } X211 + X222 = X21 + X22 < 100 \qquad (14)$$

$$\text{constraint 3: } X213 + X222 = \frac{X21}{4} + X22 < 50 \qquad (15)$$

$$\text{objective function: } \frac{X21}{c21} + \frac{X22}{c22} = \frac{X21}{2.000} + \frac{X22}{3.781} \qquad (16)$$

In this case, the solutions providing the maximum objective function are X21_max=10.0 and X22_max=0.0. At this time, a value of an objective function TotalX2 is calculated to be 5.0.

The same processing is executed also for the subset S[T3], to thereby obtain the following constraints and objective function.

[Case of Processing Start Table: Usage History T3]

$$\text{constraint 1: } X313 + X322 = \frac{X31}{5} + X32 < 150 \qquad (17)$$

$$\text{constraint 2: } X312 + X323 = X31 + \frac{X32}{4} < 100 \qquad (18)$$

$$\text{constraint 3: } X311 + X321 = X31 + X32 < 50 \qquad (19)$$

$$\text{objective function: } \frac{X31}{c31} + \frac{X32}{c32} = \frac{X31}{6.025} + \frac{X32}{4.450} \qquad (20)$$

In this case, the solutions providing the maximum objective function are calculated as: X31_max=0.0 and X32_max=40.0. At this time, the value of an objective function TotalX2 is 8.988.

In Step 809, the allotment determination module 115 refers to the values of the objective functions in the subsets to select the subset providing the maximum value of the objective functions. In this case, the subset S[T1] is selected.

The allotment determination module 115 also determines the solution of the objective function in the subset S[T1], in other words, the throughputs X11_max=3.846 and X12_max=49.23 of the processing procedure candidates s11 and s12 as the allotment ratio of the divided data {T}.

Through the above-mentioned processing, the processing procedure candidates s11 and s12 are executed based on the determined allotment ratio in Step 306.

It should be noted that in the embodiment of this invention, the data storage sections 123 are described as an example, but this invention is also applicable to a computer system including a storage system. In this case, the throughput in units of the storage apparatus 12 may be considered.

According to the embodiment of this invention, the allotments of the amount of data to be allocated to the plurality of processing procedures are determined based on the load conditions of the storage devices included in the storage apparatus 12, and further, the plurality of processing procedures are executed simultaneously in accordance with the determined allotments. In this manner, the plurality of processing procedures may be executed so that the usage rate of the storage apparatus 12 is maximized, to thereby use the performance of the storage apparatus to the fullest and enable the retrieval processing at high speed. Further, according to the embodiment of this invention, in a case where the plurality of processing procedures are executed in parallel, the processing procedures to be executed and the allotments of data to be allocated to the processing procedures may be changed dynamically depending on the load condition of the storage apparatus 12. This enables the retrieval processing capable of flexibly addressing the reduction in performance, such as the case where the load is concentrated on a specific storage device.

This invention has been described above in detail with reference to the accompanying drawings. However, this invention is not limited to such specific configuration, and encompasses various modifications and equivalent configurations as fall within the scope of the accompanying claims.

What is claimed is:

1. A computer system comprising:
   a computer for receiving a request and outputting a result in response to the request; and
   a storage system for storing data which is output based on the request,
   the computer including a first processor, a first memory coupled to the first processor, and a first network interface coupled to the first processor,
   the storage system including a second processor, a second memory coupled to the second processor, a plurality of storage devices coupled to the second processor, each exclusively storing a different category, of one or more categories, of a plurality of pieces of the data, and a second network interface coupled to the second processor,
   the first memory storing instructions, that when executed by the first processor, cause the first processor to execute:
   a request reception module for receiving the request;
   a processing procedure generation module for generating, based on the request, a plurality of processing procedures, each defining an order of access to the one or more categories of data of the plurality of categories, that are each stored in different storage devices, wherein the plurality of processing procedures are different from each other;
   a data division module for dividing the categorized data stored in the plurality of storage devices;

an information obtaining module for obtaining load information including a plurality of loads on the storage devices of the storage system;

an allotment determination module for determining, based on the obtained load information, allotments for allocating the divided categorized data to be processed by the generated plurality of processing procedures; and a processing execution module for executing, based on the determined allotments, a subset of a plurality of subsets of the generated plurality of processing procedures according to the order of access to the plurality of pieces of categorized data that are stored in different storage devices, in parallel, wherein the obtained load information further includes a plurality of upper-limit load values representing upper limits for the loads on each of the plurality of storage devices of the storage system, and wherein execution of the allotment determination module programs the first processor to:

calculate the allotments so that expected loads on each of the respective plurality of storage devices do not exceed the upper-limit load values for each of the respective plurality of storage devices and a total of the expected loads is maximized for the categorized data to be processed by a subset of the generated plurality of processing procedures, by considering all subsets of the generated plurality of processing procedures;

generate the plurality of subsets by grouping together processing procedures selected from among the generated plurality of processing procedures, wherein the processing procedures included in each respective subset first access common categorized data stored in one of the storage devices and subsequently access other categorized data in an order different from one or more other processing procedures included in a different subset of the plurality of subsets;

calculate the allotments, for each subset of the plurality subsets, so that the expected loads on each of the respective plurality of storage devices do not exceed the upper-limit load values for each of the respective plurality of storage devices, and a total of the expected loads is maximized for the categorized data to be processed by the processing procedures included in the subset; and select, for execution, one subset of the plurality of subsets providing a maximum calculated total of the expected loads, wherein the subset executed by execution of the processing execution module is the selected subset of the plurality of subsets providing the maximum calculated total of the expected loads.

2. The computer system according to claim 1, wherein execution of the information obtaining module programs the first processor to obtain load information of the plurality of storage devices with which the processing execution module is executing the generated plurality of processing procedures in parallel, wherein execution of the allotment determination module programs the first processor to:

refer to the load information to determine whether or not there is a load fluctuation of a predetermined value or more in any one of the plurality of storage devices; and recalculate the allotments of the divided categorized data to be allocated to the generated plurality of processing procedures, in a case where it is determined that there is a load fluctuation of the predetermined value or more in any one of the plurality of storage devices, and wherein execution of the processing execution module programs the first processor to execute, based on the newly calculated allotments, the generated plurality of processing procedures in parallel.

3. A data retrieval method for use in a computer system, the computer system including:

a computer for receiving a request and outputting a result in response to the request, the computer including a first processor; and a storage system for storing data which is output based on the request, the storage system having a plurality of storage devices coupled to a second processor for exclusively storing a different category, of one or more categories, of a plurality of pieces of the data, the data retrieval method comprising:

receiving, by the computer, the request;

dividing, by the computer, categorized data stored in the plurality of storage devices;

generating, by the computer, based on the request, a plurality of processing procedures, each defining an order of access to the one or more categories of data of the plurality of categories, that are each stored in different storage devices, wherein the plurality of processing procedures are different from each other;

obtaining, by the computer, load information including a plurality of loads on the storage devices of the storage system, and a plurality of upper-limit load values representing upper limits for the loads on each of the plurality of storage devices of the storage system;

determining, by the computer, allotments for allocating the divided categorized data to be processed by the generated plurality of processing procedures based on the obtained load information; and executing, by the computer, a subset of a plurality of subsets of the generated plurality of processing procedures according to the order of access to the plurality of pieces of categorized data that are stored in different storage devices, in parallel, based on the determined allotments, wherein the determining the allotments includes:

calculating, by the computer, the allotments so that expected loads on each of the respective plurality of storage devices do not exceed the upper-limit load values for each of the respective plurality of storage devices and a total of the expected loads is maximized for the categorized data to be processed by a subset of the generated plurality of processing procedures, by considering all subsets of the generated plurality of processing procedures;

generating, by the computer, the plurality of subsets by grouping together processing procedures selected from among the generated plurality of processing procedures, wherein the processing procedures included in each respective subset first access common categorized data stored in one of the storage devices and subsequently access other categorized data in an order different from one or more other processing procedures included in a different subset of the plurality of subsets;

calculating, by the computer, the allotments for each subset of the plurality of subsets, so that the expected loads on each of the respective plurality of storage devices do not exceed the upper-limit load values for each of the respective plurality of storage devices, and a total of the expected loads is maximized for the categorized data to be processed by the processing procedures included in the subset; and selecting, by the computer, one subset of the plurality of subsets providing a maximum calculated total of the expected loads, wherein the subset executed by the computer is the selected subset of the plurality of subsets providing the maximum calculated total of the expected loads.

4. The data retrieval method according to claim 3, further comprising:

obtaining, by the computer, load information of the plurality of storage devices with which the processing execution module is executing the generated plurality of processing procedures in parallel;

referring, by the computer, to the obtained load information to determine whether or not there is a load fluctuation of a predetermined value or more in any one of the plurality of storage devices;

recalculating, by the computer, the allotments of the divided categorized data to be allocated to the generated plurality of processing procedures, in a case where it is determined that there is a load fluctuation of the predetermined value or more in any one of the plurality of storage devices; and executing, by the computer, the generated plurality of processing procedures in parallel based on the newly calculated allotments.

5. A database management computer for reading, in response to a request that has been received, data to be processed in the request from a storage system that stores the data, and executing the processing on the read data to output a result, the storage system including a plurality of storage devices each exclusively storing a different category, of one or more categories, of a plurality of pieces of the data, the database management computer comprising a processor, a memory coupled to the processor, and a network interface coupled to the processor, the memory storing instructions, that when executed by the processor, cause the processor to execute:

a request reception module for receiving the request;

a processing procedure generation module for generating, based on the request, a plurality of processing procedures, each defining an order of access to the one or more categories of data of the plurality of categories, that are each stored in different storage devices, wherein the plurality of processing procedures are different from each other;

a data division module for dividing the categorized data stored in the plurality of storage devices;

an information obtaining module for obtaining load information including a plurality of loads on the storage devices of the storage system;

an allotment determination module for determining, based on the obtained load information, allotments for allocating the divided categorized data to be processed by the generated plurality of processing procedures; and a processing execution module for executing, based on the determined allotments, a subset of a plurality of subsets of the generated plurality of processing procedures according to the order of access to the plurality of pieces of categorized data that are stored in different storage devices, in parallel, wherein the obtained load information further includes a plurality of upper-limit load values representing upper limits for the loads for each of the plurality of storage devices of the storage system, and wherein execution of the allotment determination module programs the processor to:

calculate the allotments so that expected loads on each of the respective plurality of storage devices do not exceed the upper-limit load values for each of the respective plurality of storage devices and a total of the expected loads is maximized for the categorized data to be processed by a subset of the generated plurality of processing procedures, by considering all subsets of the generated plurality of processing procedures;

generate the plurality of subsets by grouping together processing procedures selected from among the generated plurality of processing procedures, wherein the processing procedures included in each respective subset first access common categorized data stored in one of the storage devices and subsequently access other categorized data in an order different from one or more other processing procedures included in a different subset of the plurality of subsets;

calculate the allotments, for each subset of the plurality of subsets, so that the expected loads on each of the respective plurality of storage devices do not exceed the upper-limit load values for each of the respective plurality of storage devices, and a total of the expected loads is maximized for the categorized data to be processed by a plurality of the processing procedures included in the subset; and select, for execution, one subset of the plurality of subsets providing a maximum calculated total value of the expected loads, wherein the subset executed by execution of the processing execution module is the selected subset of the plurality of subsets providing the maximum calculated total of the expected loads.

6. The database management computer according to claim 5, wherein execution of the information obtaining module programs the processor to obtain load information of the plurality of storage devices with which the processing execution module is executing the generated plurality of processing procedures in parallel, wherein execution of the allotment determination module programs the processor to:

refer to the load information to determine whether or not there is a load fluctuation of a predetermined value or more in any one of the plurality of storage devices; and recalculate the allotments of the divided categorized data to be allocated to the generated plurality of processing procedures, in a case where it is determined that there is a load fluctuation of the predetermined value or more in any one of the plurality of storage devices, and wherein execution of the processing execution module programs the processor to, based on the newly calculated allotments, execute the generated plurality of processing procedures in parallel.

* * * * *